US006560577B1

(12) United States Patent
Gilbert et al.

(10) Patent No.: US 6,560,577 B1
(45) Date of Patent: May 6, 2003

(54) PROCESS FOR ENCODING AUDIO FROM AN ANALOG MEDIUM INTO A COMPRESSED DIGITAL FORMAT USING ATTRIBUTE INFORMATION AND SILENCE DETECTION

(75) Inventors: Jay G. Gilbert, Beaverton, OR (US); Preston J. Hunt, Beaverton, OR (US); Andrew S. Liu, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/531,175

(22) Filed: Mar. 21, 2000

(51) Int. Cl.[7] ............................. G10L 21/00; G11B 3/64
(52) U.S. Cl. ........................................ 704/500; 369/85
(58) Field of Search ............................. 704/500; 369/85

(56) References Cited

U.S. PATENT DOCUMENTS

| 3,906,169 A | * | 9/1975 | Iwase et al. | 369/1 |
| 4,167,026 A | * | 9/1979 | Sambe et al. | 360/15 |
| 4,186,280 A | * | 1/1980 | Geiseler | 369/174 |
| 5,041,921 A | * | 8/1991 | Scheffler | 360/13 |
| 5,365,381 A | * | 11/1994 | Scheffler | 360/15 |
| 5,418,654 A | * | 5/1995 | Scheffler | 360/13 |
| 5,502,601 A | * | 3/1996 | Scheffler | 360/32 |
| 5,623,471 A | * | 4/1997 | Prigge | 369/84 |
| 5,740,146 A | * | 4/1998 | Webster | 369/107 |

* cited by examiner

Primary Examiner—Tālivaldis Ivars Šmits
(74) Attorney, Agent, or Firm—Pillsbury Winthrop LLP

(57) ABSTRACT

The present invention discloses method and system of encoding audio information (e.g., music, speech, etc.) from an analog medium (e.g., vinyl recordings, cassette tapes, etc.) into a compressed, track-oriented, digital format using attribute information and silence detection. The invention generates an analog audio signal by reproducing the audio information recorded on the analog medium, which is recorded on a plurality of discrete analog tracks. The analog audio signal is then sampled to generate a digital audio file (i.e., WAV file). The digital audio file is filtered to correct defects and then separated into a plurality of discrete digital audio tracks. Attribute information, such as track length, is accessed and confirmed by silence detection techniques in order to provide separation. This separation is accomplished such that each of the discrete digital audio tracks contains audio information corresponding to each of the discrete analog tracks, and are thus, arranged in a track-oriented digital format. The discrete digital audio tracks are then compressed (e.g., MP3) and stored, thereby providing reliable and readily accessible audio information.

30 Claims, 4 Drawing Sheets

PROCESS FOR ENCODING AUDIO FROM AN ANALOG MEDIUM INTO A COMPRESSED DIGITAL FORMAT USING ATTRIBUTE INFORMATION AND SILENCE DETECTION

BACKGROUND OF THE INVENTION

1. Field of the Invention

This invention generally relates to the field of audio recording. More particularly, the present invention relates to a method and system of encoding audio from an analog medium into a compressed digital format using attribute information and silence detection.

2. Description of Related Art

Notwithstanding the recent advancements in digital recording and the obsolescence of analog recording technology, there exists a large number of consumers who still possess audio information (i.e., music, speeches, narrations, plays, etc.) recorded on analog media. As such, there is a growing concern that such information will, in the near future, become impracticable if not impossible, to access. This is particularly true in the music industry, where digital recordings such as compact disks (CDs), digital versatile disks (DVDs), digital audio tapes (DATs), and minidisks (MDs) provide high signal-to-noise fidelity and, for the most part, have supplanted vinyl records and analog cassette tape recordings. As a result, the consumer electronics market share, once occupied by analog reproducing devices, such as record players or cassette decks, has been overtaken by digital playback devices, making it difficult to reproduce recordings on analog media.

Moreover, unlike digital recordings, vinyl recording media is particularly susceptible to degradation. In fact, significant information loss can occur by simply playing back the recorded information due to the wear and tear on the vinyl medium itself Converting information recorded on analog media into a digital format would ensure that the content is preserved in the event that the analog media is no longer accessible due to equipment obsolescence or media degradation.

Presently, consumers are readily able to convert a digital recording from one digital format to another to facilitate storage or transmission of the recorded information. These conversions employ encoding and/or compression techniques that operate on the digital nature of the data. One such technique is specified by the well-known MP3 standard (i.e., Motion Picture Experts Group-1 Audio Layer-3 standard), which provides a compression technique that compresses digital audio files by as much as 12:1, with little perceptible loss in quality.

FIG. 1 (Prior Art) is a high-level flow diagram depicting the known conversion of selected CD digital audio files into compressed digital files stored in a computer memory. By way of example, suppose a consumer desires to store certain tracks from a CD onto computer system memory. As indicated in block B110, the consumer would first load the CD of interest into the CD-ROM drive of the computer system. The consumer would then, in block B120, invoke a "ripper" program, which is a well-known software application that copies digital audio sequences from CDs, to copy the selected CD tracks onto the computer system memory. Examples of such ripper programs include, WinDAC™ (shareware), CD Copy™ (shareware), and Adaptec™ Easy CD Creator 4.

The ripper program stores the selected CD tracks as audio WAV files, the format of which complies with the well-known digital audio file standard promulgated by Microsoft®.

The WAV file formats the selected CD tracks as uncompressed digital audio data. A typical 2-minute stereo CD track may store as a 20 MB WAV file.

To convert the stored WAV file into a sensibly-sized digital file, the consumer would invoke an MP3 encoder application, as indicated by block B130. Examples of such MP3 encoder applications include, for example, MP3Enc™ (shareware) and BladeEnc™ (shareware). Some applications even integrate ripper and MP3 encoder functionality into one application such as, for example, Audiograbber™ (shareware) and MusicMatch™ (shareware). The MP3 application reduces the stored WAV file into a compressed digital MP3 file. In this manner, the 20 MB WAV file noted above may be compressed into a 1.5 MB digital file, with little, if any, degradation in audio quality. The audio information may then be reproduced by playing the MP3 file on an MP3 player application, such as, for example, Winamp™ (shareware) and Sonique™ (shareware).

Unlike CDs, however, the information recorded on analog media is neither digitally encoded nor track oriented. As such, consumers are unable to readily convert information recorded on analog media into a digital format. Therefore, what is needed is a method and system that allows consumers to encode audio from an analog medium into a compressed, track oriented digital format using attribute information and silence detection.

BRIEF DESCRIPTION OF THE DRAWINGS

The accompanying drawings, which are incorporated in and constitute a part of this Specification, illustrate an embodiment of the invention and, together with the description, explain the the invention. In the drawings.

DETAILED DESCRIPTION

The following detailed description refers to the accompanying drawings that illustrate embodiments of the present invention. Other embodiments are possible and modifications may be made to the embodiments without departing from the spirit and scope of the invention. Therefore, the following detailed description is not meant to limit the invention. Rather the scope of the invention is defined by the appended claims.

It will be apparent to one of ordinary skill in the art that the embodiments as described below may be implemented in many different embodiments of software, firmware, and hardware in the entities illustrated in the figures. The actual software code or specialized control hardware used to implement the present invention is not limiting of the present invention. Thus, the operation and behavior of the embodiments will be described without specific reference to the actual software code or specialized hardware components. The absence of such specific references is feasible because it is clearly understood that artisans of ordinary skill would be able to design software and control hardware to implement the embodiments of the present invention based on the description herein.

Figure 1:
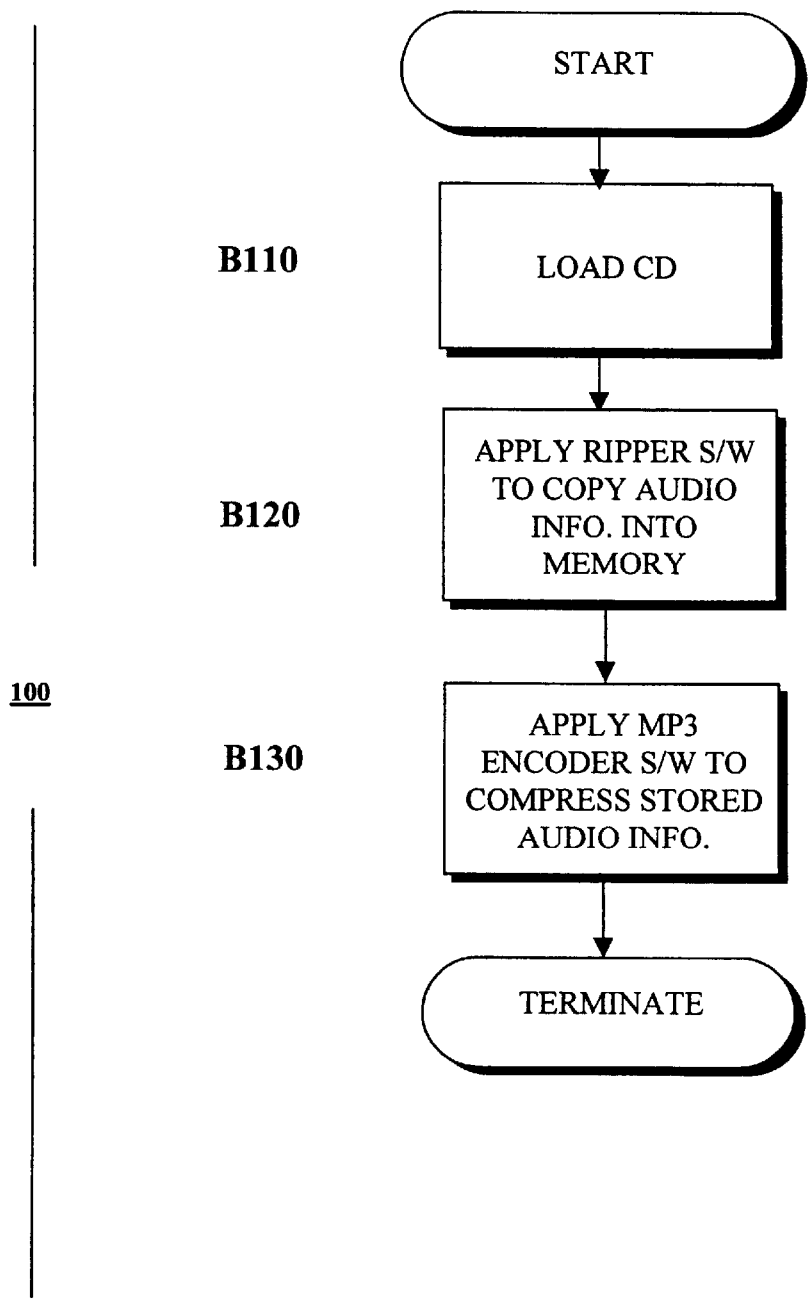
FIG. 1 (Prior Art) is a high-level flow diagram depicting the compression of CD digital audio files.
Figure 2A:
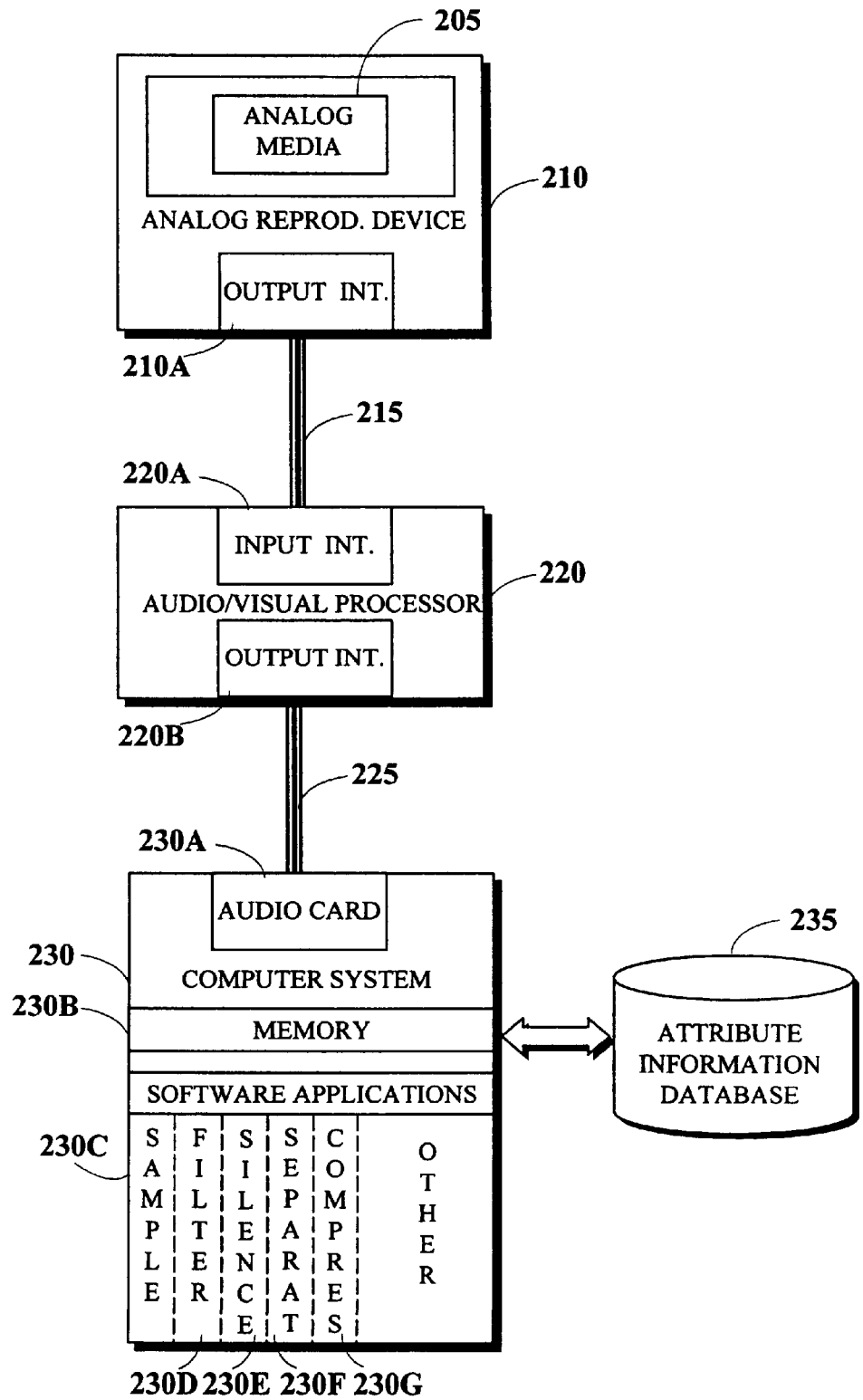
FIG. 2A is a system level diagram of an embodiment of the present invention.
Figure 2B:
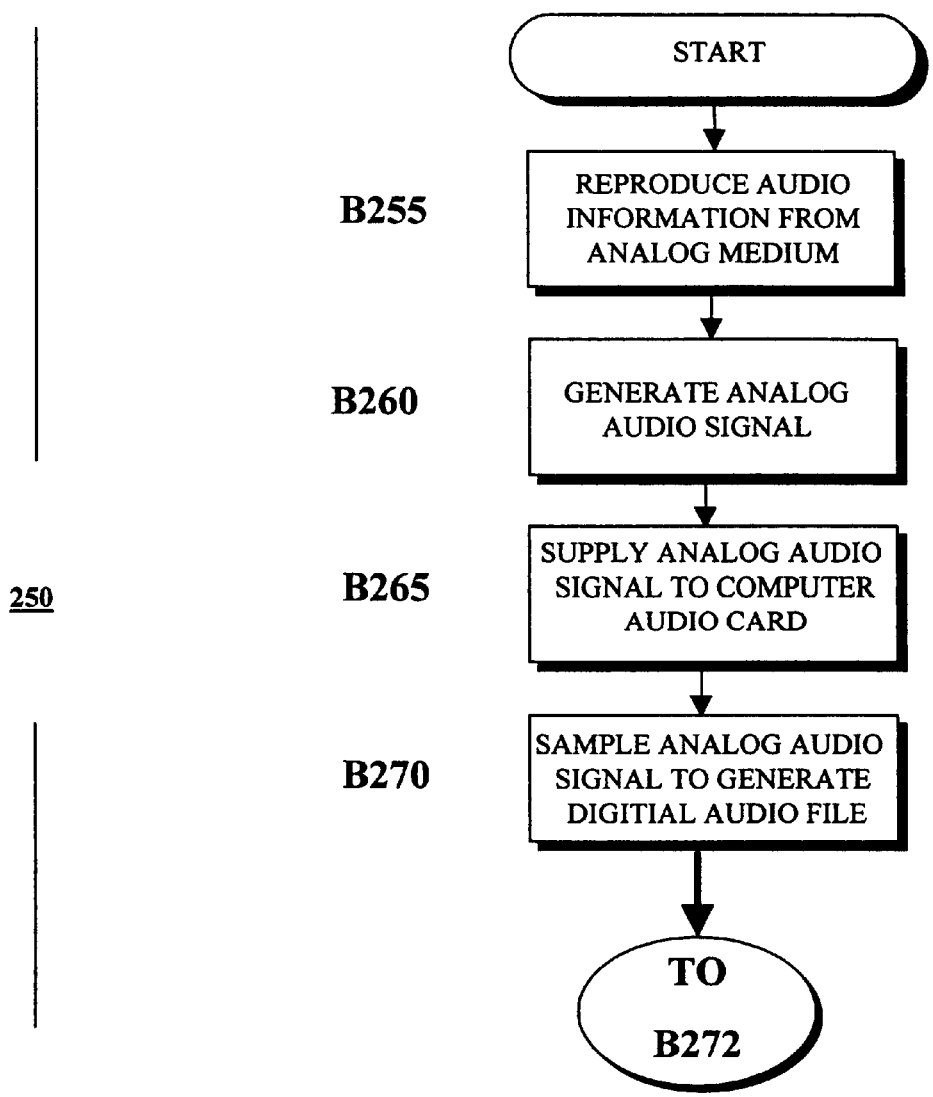
FIGS. 2B, 2C are high-level flow diagrams illustrating an embodiment of the present invention.
Figure 2C:
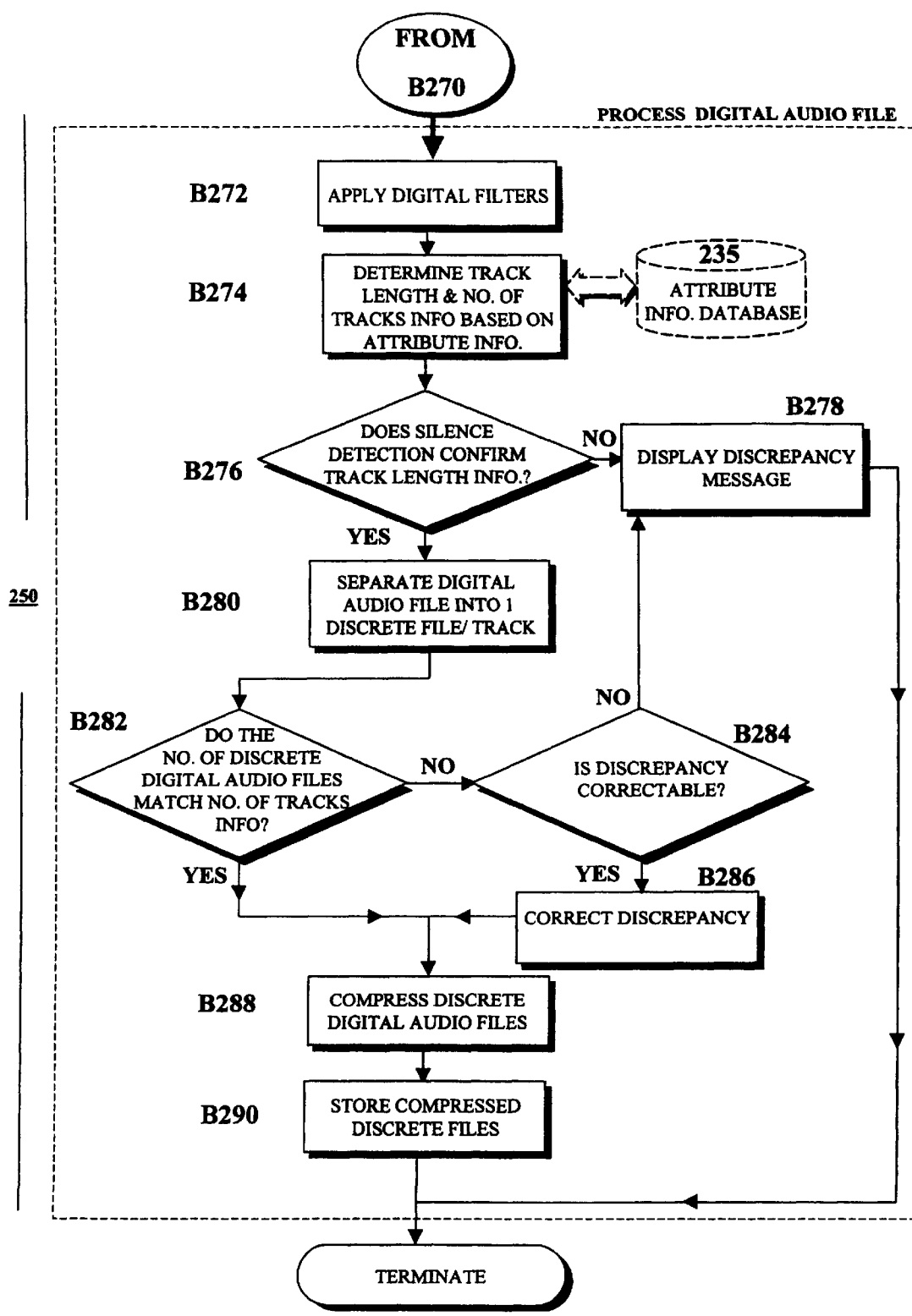

An embodiment of the present invention is illustrated by FIGS. 2A, 2B, 2C. FIG. 2A is a system level block diagram depicting various components of the embodiment. The system 200 comprises the analog medium 205, an analog reproducing device 210, an audio/visual processor 220, a computer system 230, and an attribute information database 235.

FIGS. 2B, 2C are flow diagrams illustrating the process of the embodiment. The process 250 may be stored in any storage device, such as, for example, a computer system (non-volatile) memory, an optical disk, magnetic tape, or magnetic disk. Furthermore, process 250 may be programmed when the computer system is manufactured or via a computer-readable medium at a later date. Such a medium may include any of the forms listed above with respect to storage devices and may further include, for example, a carrier wave modulated, or otherwise manipulated, to convey instructions that can be read, demodulated/decoded and executed by a computer.

FIG. 2B illustrates that in block B255, process 250 reproduces the audio information contained within the analog medium 205. The analog medium 205 may comprise a vinyl or cassette tape recording, in which the audio information is recorded in discrete analog tracks. Each track typically corresponds to an individual song of a predetermined length. The recorded information is reproduced by playing the medium 205 on analog reproducing device 210, such as, for example, a record player or tape deck.

In block B260, the analog reproducing device 210 generates an analog audio signal based on the reproduced audio information. The analog audio signal is outputted via interface 210A of analog reproducing device 210. As shown in FIG. 2A, output interface 210A is coupled to input interface 220A of audio/visual processor 220. Audio/visual processor 220 receives the analog audio signal via input interface 220A and channels the analog audio signal to an unamplified output on output interface 220B. Such an output may comprise tape output, monitor output, or line output.

In block B265, the analog audio signal is supplied to an audio card 230A installed in computer system 230. As shown in FIG. 2A, output interface 220B of analog reproducing device 210 is coupled to the input interface of audio card 230A, which receives the analog audio signal.

In block B270, the analog audio signal received by audio card 230A is sampled to generate a digital audio file. As shown in FIG. 2A, computer system 230 includes a software application 230C that samples the analog audio signal to generate a digital audio file. Artisans of ordinary skill will readily appreciate that such sampling applications are well known and include, for example, Microsoft® Sound Recorder and Adaptec™ Easy CD Creator 4. The digital audio file may be formatted as an audio WAV file and subsequently stored in the memory 230B of computer system 230.

Upon generating a digital audio file, process 250 operates on the digital audio file, as indicated in FIG. 2C, to correct any defects, separate the digital audio file into discrete track-oriented files or tracks, and compress the discrete tracks. Specifically, in block B272, filtering operations are applied to correct defects in the information contained within the digital audio file. As depicted in FIG. 2A, computer system 230 includes filtering applications 230D that operate on the digital audio file. Such defects may arise from the reproduction of the information on the analog medium and may include scratch noises, clicks, pops, hissing, etc. As is well known in the art, filtering applications 230D employ various techniques to identify and compensate for certain defects. These techniques include searching for certain values of the digital audio information that are beyond a normal range to identify and correct specific audio defects. Other techniques include: applying high-pass filters to remove low frequency noise, normalizing extreme or inconsistent volume levels to an average value, adjusting the playback pitch, and comparing adjacent data to adjust inconsistent values (i.e., removing blips by averaging the values of adjacent data in a linear fashion).

In block B274, process 250 separates the digital audio file into a plurality of discrete digital audio tracks. As illustrated in FIG. 2A, computer system 230 includes a track-separating application 230F that separates the digital audio file into a plurality of discrete digital audio tracks, each of which corresponds to an individual recorded track on analog medium 205. An example of such a silence detecting application is Adaptec™ CD Spin Doctor. The discrete digital audio tracks may be formatted as audio WAV files and may also include additional attribute information, such as number of tracks, track length, and artist/producer information.

In block B276, process 250 determines whether the number of discrete digital audio tracks match the number of tracks indicated by attribute information 235. As shown in FIG. 2A, computer system 230 includes attribute information 235 regarding the recorded audio information and covers such information as the number of tracks, individual track length, and artist/producer information. Attribute information 235 is readily available by subscribing or accessing online database services, such as, for example, Compact Disk Database™ (CDDB). Attribute information 235 may used to identify the beginning and end of each of the tracks and confirm the number of tracks within the digital audio file.

If the number of discrete digital audio tracks does not match the indicated number of tracks, process 250 progresses to block B277 to display a message indicating a possible discrepancy with the number of tracks. Then, in block B278, process 250 further determines whether some of the discrete digital audio tracks may be combined to match the indicated number of tracks. This determination may be accomplished by detecting a discrete digital audio track that is smaller than the tracks, thereby indicating that the smaller track may actually be part of an adjacent larger track. In addition, this determination may be achieved by employing silence detecting application 230E, which determines track length information by detecting and measuring the period of silence interposed between the tracks to separate each of the tracks. An example of such a silence detecting application is Adaptec™ CD Spin Doctor. By detecting a period of silence between the tracks that is smaller than the other silent periods, silence detecting application 230E may indicate whether that a track may have been prematurely separated into two or more discrete tracks and their likelihood of being combined. If some of the discrete digital audio tracks may be combined to match the indicated number of tracks, process 250 progresses to block B284, where the information provided by attribute information 235 and silence detecting application 230E may be used to combine the discrete digital audio tracks into the indicated number of tracks. If not, process 250 advances to block B285, which displays a message indicating a possible discrepancy with track lengths. Then, in block B286, the user, by virtue of a track-separating application 230F, manually designates the combination or division of the discrete digital audio tracks to match the indicated number of tracks.

Returning to block B276, if the number of discrete digital audio tracks matches the indicated number of tracks, process 250 progresses to block B280. In block B280, process 250 utilizes attribute information 235 to determine whether the lengths of the discrete digital audio tracks match track lengths indicated by attribute information 235. If so, process 250 proceeds to block B288. If not, process 250 advances to block B285, which, as noted above, displays a message indicating a possible discrepancy with track lengths. Then, in block B286, the user may manually designate the combination or division of the discrete digital audio tracks to match the indicated track lengths.

Finally, in block B288, the discrete digital audio tracks are compressed and in block B290 the compressed discrete tracks are stored in the memory 230B of computer system 230. As shown in FIG. 2A, computer system 230 further includes a compression application 230G, which compresses each of the discrete digital audio tracks into smaller-sized files. Compression application 230G may comprise an MP3 encoder application, to ensure the fidelity of the discrete digital files.

Thus, the embodiments presented herein utilize attribute information and silence detection to encode audio information from an analog medium into a compressed track oriented digital format. In doing so, these embodiments provide a novel system and method that enable consumers to readily convert information recorded on analog media into a reliable and storable digital form.

It is important to note that the foregoing description of embodiments provides illustration and description, but is not intended to be exhaustive or to limit the invention to the precise form disclosed. Modifications and variations are possible consistent with the above teachings or may be acquired from practice of the invention. The scope of the invention is defined by the claims and their equivalents.

What is claimed:

1. A method comprising:
    generating an analog audio signal by reproducing audio information recorded on an analog medium, said audio information being recorded on a plurality of discrete analog tracks on said analog medium;
    sampling said analog audio signal by one of a plurality of applications executed on a computer to generate a digital audio file;
    processing said digital audio file by said plurality of applications to separate said digital audio file into a plurality of discrete digital audio tracks, wherein said plurality of applications include attribute information and silence detection to provide separation such that each of said discrete digital audio tracks contains audio information corresponding to one of said plurality of discrete analog tracks;
    compressing each of said discrete audio digital tracks by said applications; and
    storing each of said compressed discrete audio digital tracks into a memory.

2. The method of claim 1, wherein said processing further includes filtering operations to correct audible defects.

3. The method of claim 2, wherein said attribute information is collected from a service provider and includes at least one of track length information, number of tracks information, and artist and producer information.

4. The method of claim 3, wherein said processing further includes silence detection to detect silence interposed between said tracks and is used to confirm said track length information provided by said attribute information.

5. The method of claim 4, wherein said processing further includes determining whether the number of said discrete digital audio tracks corresponds to said number of tracks information provided by said attribute information.

6. The method of claim 5, wherein said processing further includes,
    generating a message to indicate that a discrepancy exists when the number of said discrete digital audio tracks does not correspond to said number of tracks information,
    determining whether some of said discrete digital audio tracks may be combined to correspond to said number of tracks information provided by said attribute information,
    wherein, in response to determining that some of said discrete digital audio tracks may be combined, said discrete digital audio tracks are combined using at least one of said attribute information and said silence detection to correspond to said number of tracks information, and
    wherein, in response to determining that none of said discrete digital audio tracks may be combined, a message is generated to indicate that a discrepancy exists and said discrete digital audio tracks are combined or divided to generate a number of said discrete digital audio tracks that correspond to said number of tracks information.

7. The method of claim 6, wherein said processing further includes determining whether the track length for each of said discrete digital audio tracks correspond to said track length information provided by said attribute information.

8. The method of claim 7, wherein said processing further includes,
    generating a message to indicate that a discrepancy exists when the track length for each of said discrete digital audio tracks does not correspond to said track length information provided by said attribute information, wherein said discrete digital audio tracks are combined or divided to generate a number of said discrete digital audio tracks having track lengths that correspond to said said track length information.

9. The method of claim 8, wherein said digital audio file and each of said discrete digital audio tracks is configured in accordance with a WAV file format.

10. The method of claim 9, wherein said compressing by said applications is executed in accordance with an MP3 standard.

11. A system for encoding audio information, recorded on a plurality of discrete analog tracks on an analog medium, into a digital format, said audio information reproduced by an analog reproducing device and processed by an audio processing device to generate an analog audio signal, said system comprising:

a computer for executing a plurality of applications that sample said analog audio signal to generate a digital audio file, process said digital audio file to separate said digital audio file into a plurality of discrete digital audio tracks each of which contain audio information corresponding to one of said plurality of discrete analog tracks, and compress each of said discrete audio digital tracks; and a memory to store each of said compressed discrete audio digital tracks, wherein said plurality of applications include attribute information and silence detection to facilitate the separation of said digital audio file into said plurality of discrete digital audio tracks.

12. The system of claim 11, wherein said plurality of applications further include filtering operations to correct audible defects.

13. The system of claim 12, wherein said attribute information is collected from a service provider and includes at least one of track length information, number of tracks information, and artist and producer information.

14. The system of claim 13, wherein said silence detection detects silence interposed between said tracks and is used to confirm said track length information provided by said attribute information.

15. The system of claim 14, wherein said processing of said digital audio file further includes determining whether the number of said discrete digital audio tracks corresponds to said number of tracks information provided by said attribute information.

16. The system of claim 15, wherein said processing of said digital audio file further includes, generating a message to indicate that a discrepancy exists when the number of said discrete digital audio tracks does not correspond to said number of tracks information, determining whether some of said discrete digital audio tracks may be combined to correspond to said number of tracks information provided by said attribute information, wherein, in response to determining that some of said discrete digital audio tracks may be combined, said discrete digital audio tracks are combined using at least one of said attribute information and said silence detection to correspond to said number of tracks information, and wherein, in response to determining that none of said discrete digital audio tracks may be combined, a message is generated to indicate that a discrepancy exists and said discrete digital audio tracks are combined or divided to generate a number of said discrete digital audio tracks that correspond to said number of tracks information.

17. The system of claim 16, wherein said processing of said digital audio file includes determining whether the track length for each of said discrete digital audio tracks correspond to said track length information provided by said attribute information.

18. The system of claim 17, wherein said processing of said digital audio file further includes, generating a message to indicate that a discrepancy exists when the track length for each of said discrete digital audio tracks does not correspond to said track length information provided by said attribute information, wherein said discrete digital audio tracks are combined or divided to generate a number of said discrete digital audio tracks having track lengths that correspond to said said track length information.

19. The system of claim 18, wherein said digital audio file and each of said discrete digital audio tracks is configured in accordance with a WAV file format.

20. The system of claim 19, wherein said compressing by said applications is executed in accordance with an MP3 standard.

21. A computer-readable medium encoded with a plurality of processor-executable instruction sequences for:

generating an analog audio signal by reproducing audio information recorded on an analog medium, said audio information being recorded on a plurality of discrete analog tracks on said analog medium;

sampling said analog audio signal by one of a plurality of applications executed on a computer to generate a digital audio file;

processing said digital audio file by said plurality of applications to separate said digital audio file into a plurality of discrete digital audio tracks, said plurality of applications include attribute information and silence detection to provide separation such that each of said discrete digital audio tracks contains audio information corresponding to one of said plurality of discrete analog tracks; and compressing each of said discrete audio digital tracks by said applications.

22. The computer-readable medium of claim 21, wherein said processing further includes filtering operations to correct audible defects.

23. The computer-readable medium of claim 22, wherein said attribute information is collected from a service provider and includes at least one of track length information, number of tracks information, and artist and producer information.

24. The computer-readable medium of claim 23, wherein said processing further includes silence detection to detect silence interposed between said tracks and is used to confirm said track length information provided by said attribute information.

25. The computer-readable medium of claim 24, wherein said processing further includes determining whether the number of said discrete digital audio tracks corresponds to said number of tracks information provided by said attribute information.

26. The computer-readable medium of claim 25, wherein said processing further includes,

- generating a message to indicate that a discrepancy exists when the number of said discrete digital audio tracks does not correspond to said number of tracks information,
- determining whether some of said discrete digital audio tracks may be combined to correspond to said number of tracks information provided by said attribute information,
- wherein, in response to determining that some of said discrete digital audio tracks may be combined, said discrete digital audio tracks are combined using at least one of said attribute information and said silence detection to correspond to said number of tracks information, and
- wherein, in response to determining that none of said discrete digital audio tracks may be combined, a message is generated to indicate that a discrepancy exists and said discrete digital audio tracks are combined or divided to generate a number of said discrete digital audio tracks that correspond to said number of tracks information.

27. The computer-readable medium of claim 26, wherein said processing further includes determining whether the track length for each of said discrete digital audio tracks correspond to said track length information provided by said attribute information.

28. The computer-readable medium of claim 27, wherein said processing further includes,

- generating a message to indicate that a discrepancy exists when the track length for each of said discrete digital audio tracks does not correspond to said track length information provided by said attribute information,
- wherein said discrete digital audio tracks are combined or divided to generate a number of said discrete digital audio tracks having track lengths that correspond to said track length information.

29. The computer-readable medium of claim 28, wherein said digital audio file and each of said discrete digital audio tracks is configured in accordance with a WAV file format.

30. The computer-readable medium of claim 29, wherein said compressing by said applications is executed in accordance with an MP3 standard.

* * * * *